United States Patent [19]
Sullivan

[11] Patent Number: 5,217,164
[45] Date of Patent: Jun. 8, 1993

[54] BIODEGRADABLE PRODUCT DISPENSER

[75] Inventor: Thomas D. Sullivan, Robbinsville, N.J.

[73] Assignee: Carter-Wallace, Inc., New York, N.Y.

[21] Appl. No.: 792,541

[22] Filed: Nov. 13, 1991

[51] Int. Cl.$^5$ ............................................. B65D 5/54
[52] U.S. Cl. ................................. 229/101.1; 206/385; 229/101.2; 229/201; 229/207
[58] Field of Search .................. 229/101.1, 101.2, 201, 229/202, 207, 235; 206/385

[56] References Cited

U.S. PATENT DOCUMENTS

| | | | |
|---|---|---|---|
| D. 248,373 | 7/1978 | Allen . | |
| D. 310,617 | 9/1990 | Pozzi . | |
| 1,072,914 | 9/1913 | Comings | 229/101.1 |
| 1,560,681 | 11/1925 | Fisher . | |
| 1,598,951 | 9/1926 | Wright . | |
| 2,179,504 | 11/1939 | Hasbrook . | |
| 2,490,133 | 12/1949 | Inman | 229/101.2 |
| 2,852,179 | 9/1958 | Bieler | 229/101.1 |
| 2,969,902 | 1/1961 | Cage | 229/101.1 |
| 3,128,031 | 4/1964 | Dembo | 229/101.1 |
| 3,137,437 | 6/1964 | Svensson | 229/101.1 |
| 3,291,372 | 12/1966 | Saidel | 229/101.2 |
| 3,539,093 | 11/1970 | Massengill | 229/207 |
| 3,967,773 | 7/1976 | Kaufmann | 229/101.2 |
| 4,091,929 | 5/1978 | Krane . | |
| 4,762,233 | 8/1988 | Sears et al. | 229/101.2 |
| 5,042,666 | 8/1991 | Dolenc | 229/101.1 |

FOREIGN PATENT DOCUMENTS

| | | | |
|---|---|---|---|
| 53609 | 9/1937 | Denmark . | |
| 23411 | 2/1981 | European Pat. Off. | 229/101.1 |
| 763000 | 4/1934 | France . | |
| 88297 | 1/1937 | Sweden . | |
| 1218784 | 3/1971 | United Kingdom | 229/207 |

OTHER PUBLICATIONS

*Modern Packaging*, 1956, p. 219.
*Modern Packing*, 1948, p. 684.

*Primary Examiner*—Gary E. Elkins
*Attorney, Agent, or Firm*—Watov & Kipnes

[57] ABSTRACT

A dispenser for a product in stick form comprised of inner and outer concentric sleeves of biodegradable material, a base for holding the stick in one end of the inner sleeve, an insert for closing off the other end of the outer sleeve, parallel circumferential tear lines in the outer sleeve defining a central section thereof, and a plurality of parallel circumferential tear lines in the inner sleeve defining circumferential segments that can be removed one by one as the stick is used for exposing a new portion of the stick for use.

24 Claims, 10 Drawing Sheets

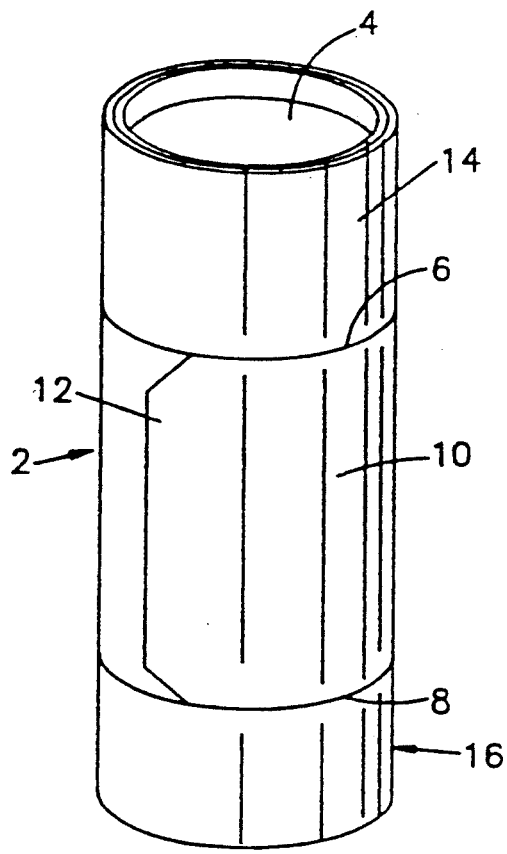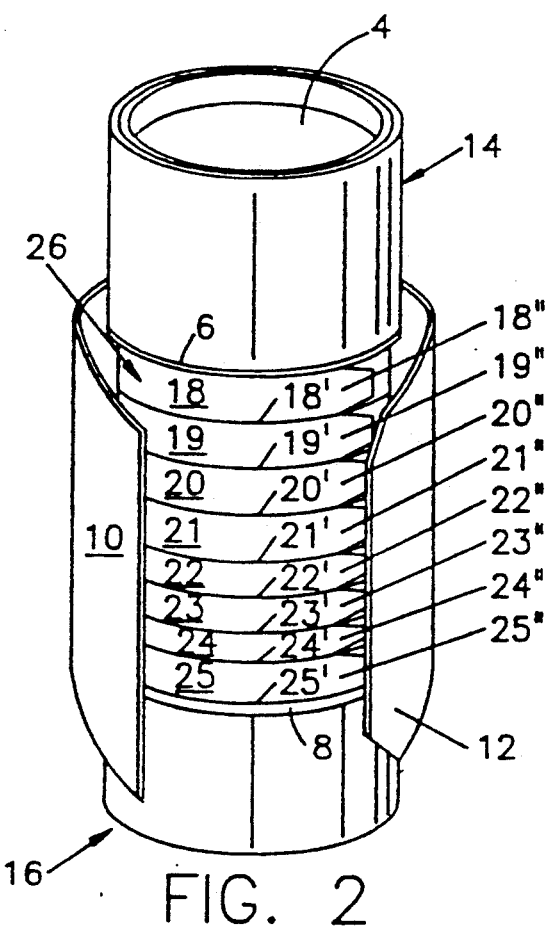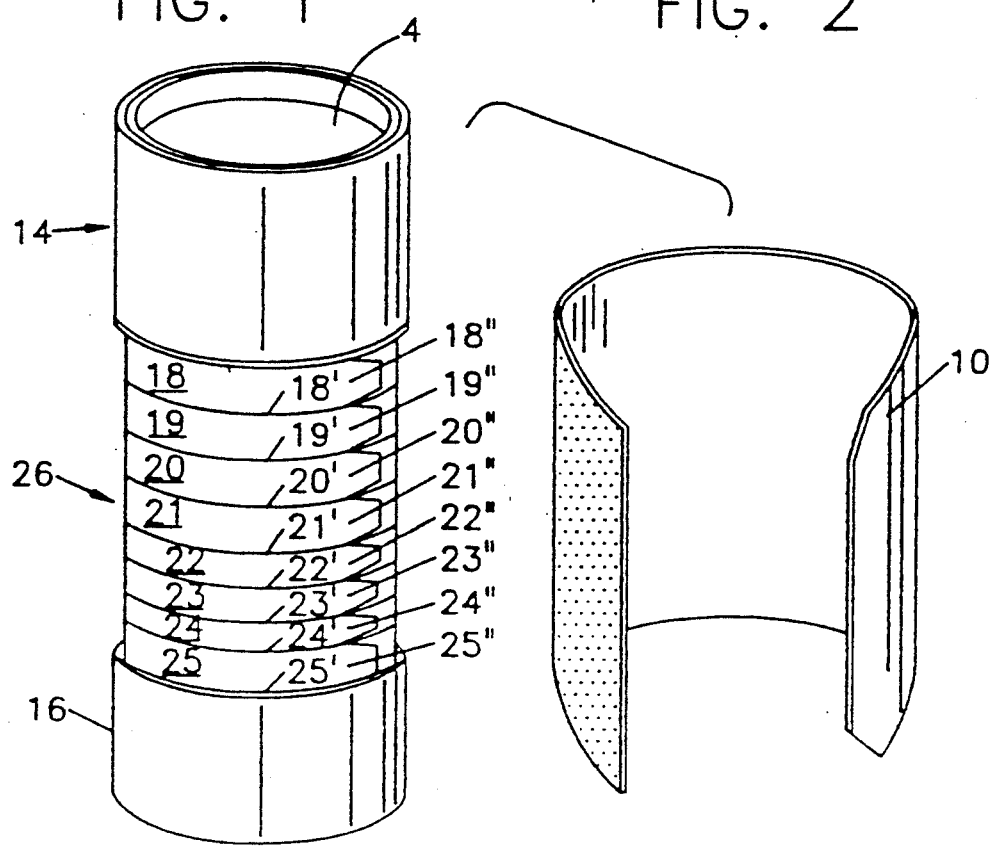

BIODEGRADABLE PRODUCT DISPENSER

RELATED APPLICATIONS

This present application is related to co-pending design application Ser. No. 07/803,404; U.S. Ser. No. 07/803,405; and U.S. Ser. No. 07/803,408; each having a filing date of Dec. 5, 1991. Each of these design applications co-pending herewith are assigned to the same assignee as the present invention.

BACKGROUND OF THE INVENTION

A growing part of the buying public is insisting on product containers or dispensers that have the minimum effect on the environment. Thus, for example, they would resist purchasing spray dispensers utilizing propellants that could have an adverse effect on the ozone layer or dispensers made of non-biodegradable material. From a strictly competitive point of view it is essential that the cost of the dispenser be reduced as much as possible without noticeably decreasing the ease with which it can be used.

SUMMARY OF THE INVENTION

In accordance with the invention, a dispenser of a product in stick form is comprised of inner and outer concentric sleeves that are permanently adhered at one end to a base and means such as an insert for closing the opposite or top end of the outer sleeve. The product stick is within the inner sleeve, and each sleeve is formed from sheet material that is wrapped around the base so as to have a region of overlap. The sleeves may be formed from separate sheets or a single sheet, in different embodiments of the invention.

The interior of the inner sleeve is divided into one or more annular segments by circumferential tear lines that may be formed by double reverse cuts, and extensions of the segments that serve as pull tabs, lie within the region of overlap and are temporarily adhered by pressure sensitive glue or the like. Thus, as a product stick within the inner sleeve is worn down to a segment, it can be removed by pulling on its tab to expose another portion of the product stick for use.

A central section of the outer sleeve that overlies the segments of the inner sleeve is defined by circumferential tear lines, and the portion of the central section within the region of overlap is temporarily adhered so that it can serve as a tab by which the central portion can be torn away to expose at least the lower segments of the inner sleeve. When the central section is removed, the end of the outer sleeve containing the insert is entirely separated so that it can serve as a cap that fits over the remaining upper segments of the inner sleeve.

No expensive mechanical means are required, as in some dispensers, for advancing the product stick as it is used. The annular segments are merely torn away.

Furthermore, the dispenser can be manufactured from sleeves formed by wrapping a single sheet or the separate sheets, as the case may be, about a base member or mandrel. The sleeves thus formed are held together by glue applied to appropriate areas of the sheet or sheets.

Since all of the components may be made of biodegradable material, their disposal does not have an adverse effect on the environment. Also, through use of the tear away segments as the product is used, the dispenser package is automatically broken into smaller segments or pieces which are more rapidly biodegraded than a single large dispenser package.

BRIEF DESCRIPTION OF THE DRAWINGS

The various embodiments of the invention are described with reference to the various figures of the drawings, in which corresponding components are identified by the same reference designation, but where there is a slight difference, the reference designation is primed. In the drawings, the figures are as follows:

FIG. 1 is an outside view of a product stick dispenser of this invention in which the inner and outer sleeves are formed from separate sheets;

FIG. 2 is a view of a product stick dispenser of FIG. 1 with the central section of its outer sleeve partially removed;

FIG. 3 includes a view of a product stick dispenser of FIG. 1 with the central section of the outer sleeve completely removed and a view of the central section that has been removed;

DETAILED DESCRIPTION OF THE INVENTION

Figure 6:
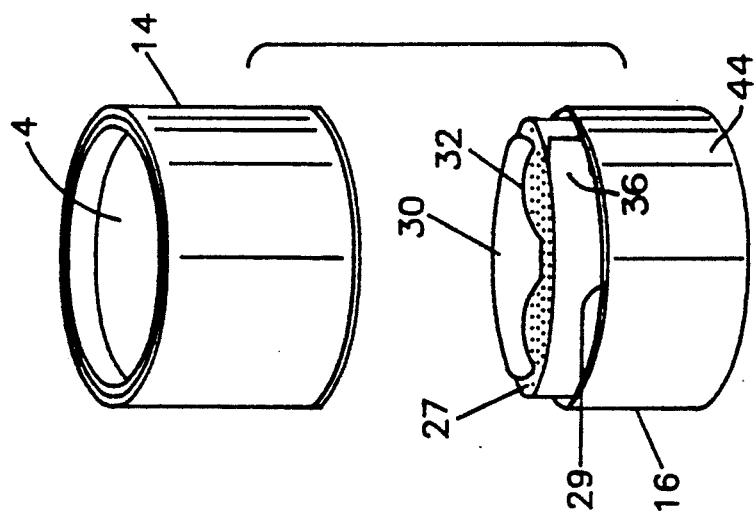
FIG. 6 shows separate cap and base portions of a product stick dispenser of FIG. 1 after the last removable segment of the inner sleeve has been torn away.

FIG. 1 is an external view of a product dispenser of this invention in which the inner and outer sleeves are constructed from separate sheets of material so that only an outer sleeve 2 and a cover insert 4 are in view. Tear lines 6 and 8 in the outer sleeve 2 define a central section 10 having a tab 12 at one end thereof which can be used to tear the central section 10 from the outer sleeve 2 and leave a removable cap section 14 and a base section 16. FIG. 2 shows that when the central section 10 is nearly torn away a plurality of contiguous annular segments 18 through 25 of an inner sleeve 26 become accessible, in this example. At the bottom of the segments 18 through 25 are respective tear lines 18'-25'. All tear lines may be formed by what is known as a double reverse cut scores, for example. As the product stick, not shown, that is contained within the inner sleeve 26 is used, successive ones of the segments 18-25 can be removed by pulling on their respective tabs 18"-25" extending from the ends of sections. FIG. 3 shows the dispenser with the central section 10 of the outer sleeve 2 completely removed as well as the central section 10 that has been removed. Note that for this and other embodiments of the invention, it is preferred that biodegradable material be used for forming the dispenser.

Figure 5:
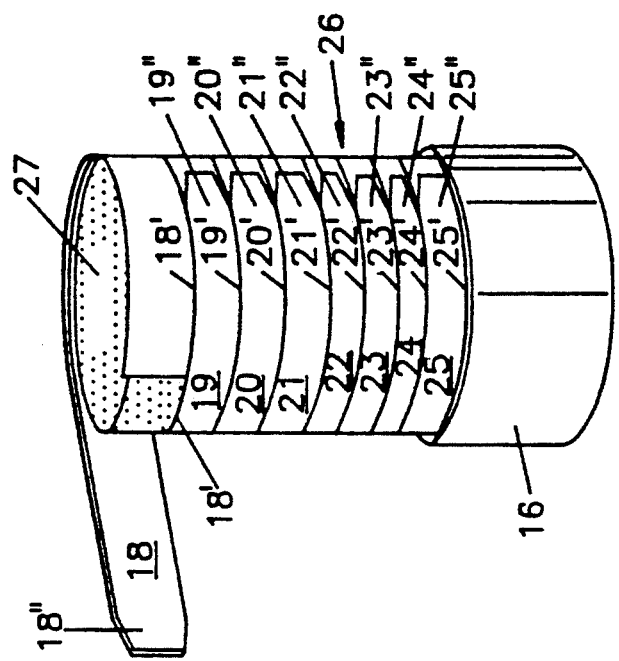
FIG. 5 is a view of a product stick dispenser of FIG. 1 showing an annular segment of the inner sleeve that has been partially torn away.
Figure 4:
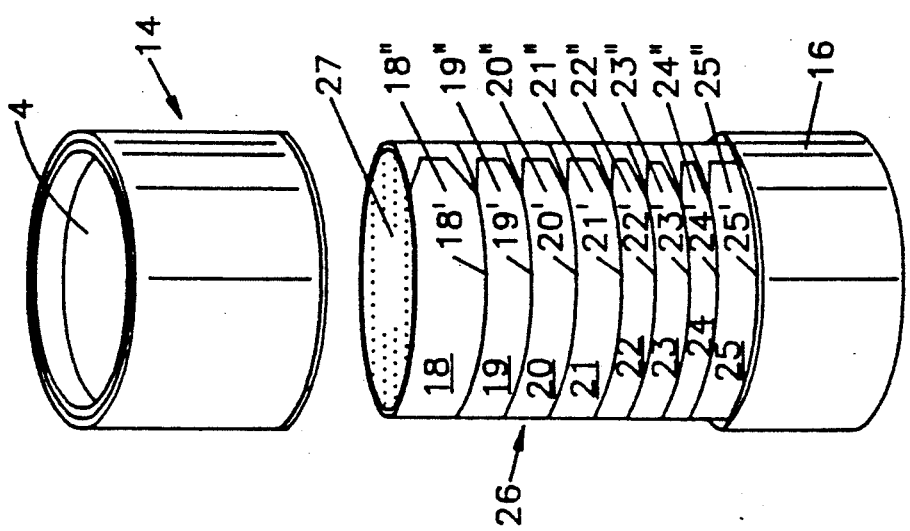
FIG. 4 is a view of a product stick dispenser of FIG. 1 showing the separate cap formed by the upper end of the outer sleeve when the central section of the outer sleeve has been completely removed.

FIG. 4 shows that after the central section 10 is removed, the cap section 14 and its insert 4 form a cap that may be removed so as to reveal the top surface of a product stick 27. FIG. 5 shows the inner sleeve of the dispenser of FIGS. 1-4 with the segment 18 partially torn away along the tear line 18', for exposing a topmost portion of the product stick 27 for use, in this example.

FIG. 6 shows the cap 14, 4 and a base section 16 after the last annular segment 25 of the inner sleeve 26 has been torn away so as to reveal a top portion of a base 28 that is located in the bottom end or remainder 29 of the inner sleeve 26. In order to hold the product stick 27 in such manner as to prevent it from falling out if the dispenser is turned upside down, or to otherwise secure the product stick 27 therein, a projection 30 that is undercut at 32 is mounted on the top of the base 28. The upper surface of the projection 30 is preferably curved so that all the product above it can be used without injuring the skin of a user. With the product in a liquid or semi-liquid state, it is poured into the inner sleeve 26, and flows into the undercut portion 32 of the projection 30 so as to have a purchase thereon when it solidifies. Migration of the product through the inner sleeve 26 may be prevented by making its inner side impermeable as by coating it or by using proper material. The details of the base 28 will be further discussed in connection with FIGS. 10, 13 and 14.

Figure 7A:
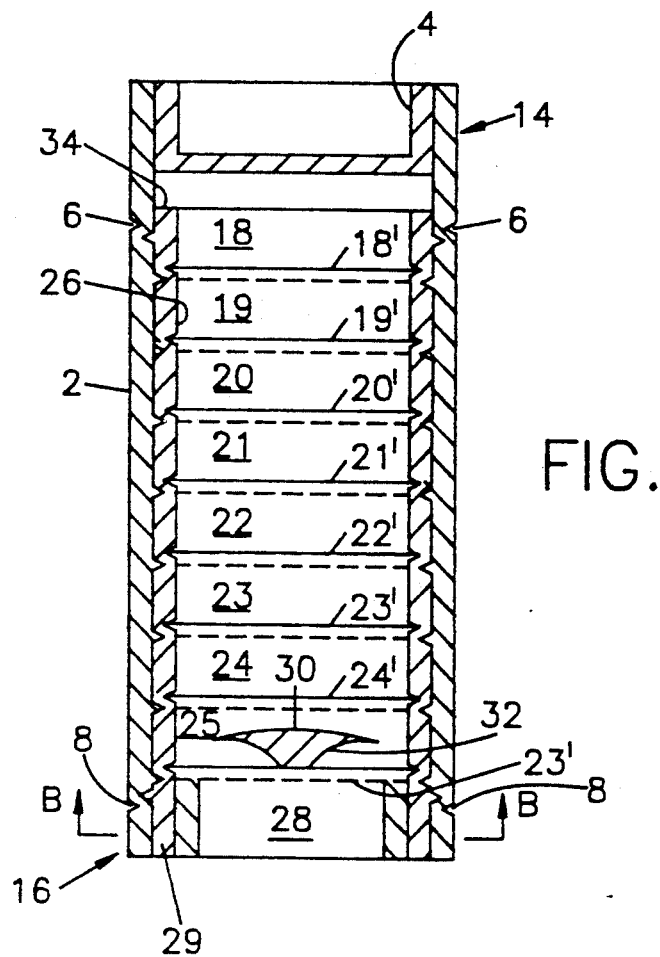
FIG. 7A is an axial cross section of a dispenser of FIG. 1 of one embodiment of the invention.
Figure 7B:
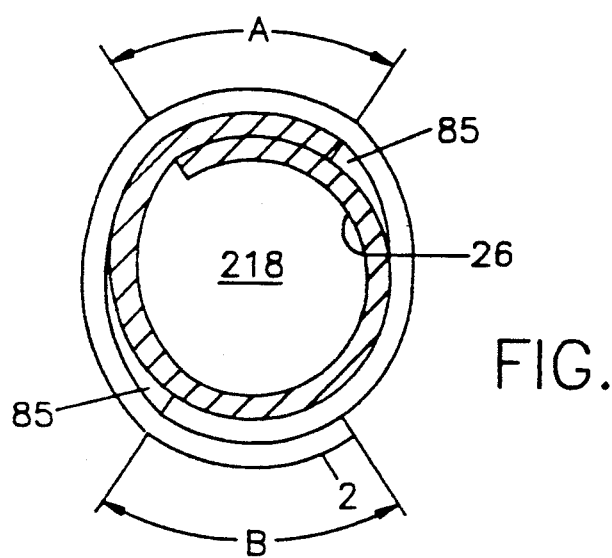
FIG. 7B is a radial cross section of a complete dispenser of the one embodiment of the invention taken at a vertical point indicated by B—B in FIG. 7A.

Reference is now made to the axial cross section of FIG. 7A and the radial cross section of FIG. 7B for further explanation of one way of constructing the dispenser of this invention. In FIG. 7A, the bottom 29 of the inner sleeve 26 is shown as being in contact with the base 28, and the bottom of the outer sleeve 2 is in contact with the outer surface of the bottom 29 of the inner sleeve 26. In this particular embodiment, the outer sleeve 2 is longer than the inner sleeve 26 so that its top extends beyond the top of the inner sleeve 26, and the cover insert 4 is inserted into the extension thus formed. The tear line 6 in the outer sleeve 2 is preferably located a given distance below the top end 34 of the inner sleeve 26 so that when the central section 10 of the outer sleeve 2 is torn away, the cap 14 sits freely on the upper end 34 of the inner sleeve. The tearing along the tear line 8 isolates the base section 16 of the outer sleeve 2, and the top of the bottom section 16 of the outer sleeve 2 is preferably below the top of the bottom section 24 of the inner sleeve 26.

Although the inner sleeve 26 and the outer sleeve 2 could be formed from complete sleeves in which axially extending tear lines are provided so that tabs mounted on one side thereof could be pulled and remove the center section 10 of the outer sleeve 2 and the segments 18-25 of the inner sleeve 26, it is preferred that they be formed from sheet material that is wrapped around a common axis and the base 28 in such manner that each has a region of overlap extending only part way around its circumference. In the axial cross section of the embodiment of the invention shown in FIG. 7A, the overlaps of the separate sheets of material from which the sleeves 2 and 26 are formed, are not present because of the particular cross section shown, but they are present in the radial cross section of FIG. 7B. The sheet from which the inner sleeve 26 is formed overlaps within the angle A, and the overlap of the sheet from which the outer sleeve 2 is formed overlaps within the angle B, in this example. Although FIG. 7B is taken at a point B—B of FIG. 7A, it is not a cross section of FIG. 7A, but rather a cross section of a complete dispenser taken at a level B—B. The tear lines 6, 8 and 18'-25' are shown in 7A as being axially offset circumferential cuts in opposite sides of a sheet.

Figure 8:
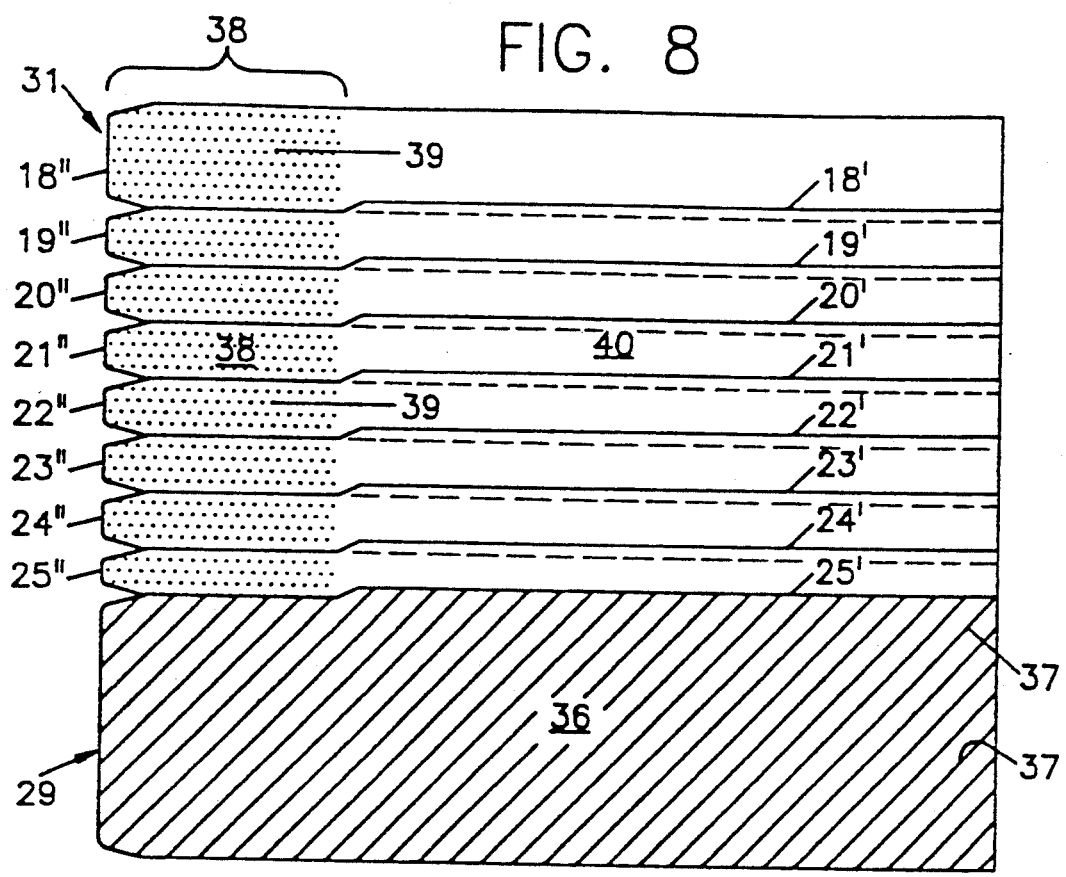
FIG. 8 is an example of a layout of a sheet of material from which an inner sleeve may be formed.

Reference is now made to FIG. 8 showing a sheet 31 from which the inner sleeve 26 may be formed. A strip or region 36 that is shown extends along the entire bottom of the sheet 31. It will form the lower section of 29 of the inner sleeve 26 and is coated with a permanent glue shown by diagonal lines 37. A region 38 on the left side of the sheet 31 is coated with pressure sensitive glue 39 that is shown by speckling. The region 38 will be the area of overlap, i.e. it will be within the angle A of FIG. 7B, and it is the area occupied by the tabs 18"14 25", in this example. A region 40 that is outside the regions 36 and 38 and through which the tear lines 18'-25' extend is free of glue, but may have a coating that is impervious to the material of product stick 27. It is apparent that any glue within the region of overlap 38 on the left side of the sheet 31 could be located on the right side of the sheet 31 but on the opposite surface thereof from that shown.

Figure 9:
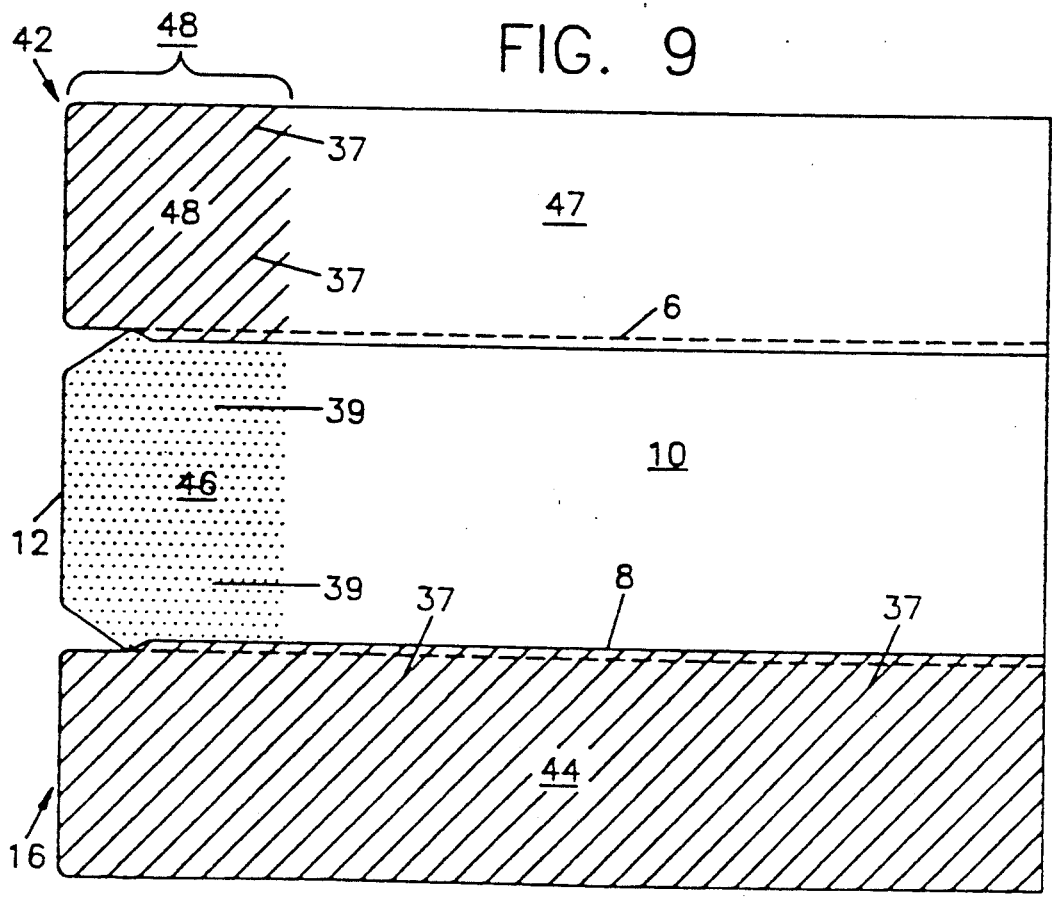
FIG. 9 is an example of a layout of a sheet of material from which an outer sleeve may be formed.

Reference is made to FIG. 9 showing a sheet 42 from which the outer sleeve 2 may be formed. A strip 44 is formed below the tear line 8, and provides the base section 16. It is coated with a permanent glue 37 shown by diagonal lines, so that when the sheet 42 is wrapped around the lower section 29 of the inner sleeve 26, it will be permanently adhered thereto and to itself in the region of overlap. The central section 10 of the sheet 6 lies between the tear lines 6 and 8. At least a portion 46 of the central section 10 that is within the region of overlap, angle B, is coated with a pressure sensitive glue 39 as indicated by speckling. The portions 47 and 48 of the sheet 42 that are above the tear line 6 provide part of the cap 14, 4. The portion 48 is within the region of overlap and coated with a permanent glue 37 shown by diagonal lines so as to adhere to itself in the overlapped region. It will be apparent that any glue in the region of overlap that is shown on the left side of the sheet 42 could be on the right side and on the opposite surface from that shown in FIG. 9.

Figure 10:
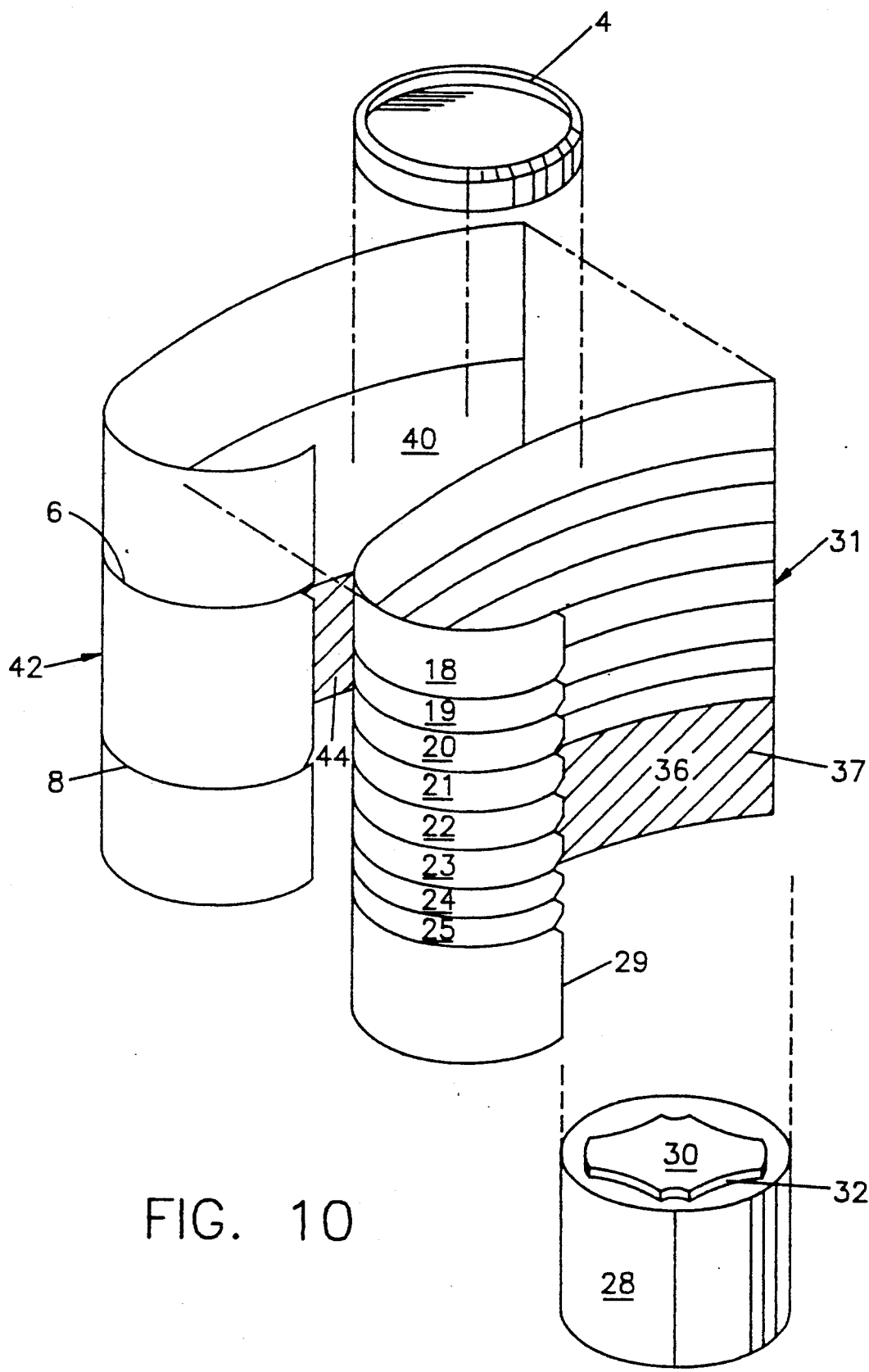
FIG. 10 is an exploded view illustrating the assembly of the product dispenser of FIG. 1 for one embodiment of the invention.

Reference is made to FIG. 10 for an explanation of a method of assembling a product dispenser of this invention utilizing the separate sheets of material (biodegradable, in this example) of FIGS. 8 and 9. The sheet 31 of FIG. 8 is wrapped around the base 28 so that its strip 36 that is coated with permanent glue 37, forms a permanent bond around the entire circumference of the base 28 as well as a permanent bond with itself in the overlapped region within the angle A of FIG. 7B. The region 38 of the sheet 31 that is coated with pressure sensitive glue 39 forms a temporary bond within the overlapped region within angle A so that the inner sleeve 26 is completed. The height of the strip 36 of inner sleeve 26 is higher than the height of the base 28, and the strip 44 of outer sleeve 2 is less than the height of strip 36 and also the height of base 28.

The outer sheet 42 is then wrapped around the sleeve 26 just formed by the sheet 31 so that its strip 44 is permanently bonded via glue 37 to the outer surface of the lower end 29 of the sleeve 26. Note that the sleeves 2 and 26 do not appear in FIG. 10 because they are not shown in a formed state. There is no bonding of the central section 10 of the sheet 42 with the outer surface of the sleeve 26 formed as just described by the sheet 31, but the pressure sensitive glue 39 in the overlapped region 46, that is within the angle B of FIG. 7B, forms a temporary bond. At the same time, the region 48 forms a permanent bond via permanent glue 37 in the overlapped region. The outer sleeve 2 is now completed.

At this point in the procedure, product 27 that has been liquified by heat, or by a chemical reaction, or otherwise, is poured into the top of the inner sleeve 26 until it reaches its top level 34, in this example. When the product 27 cools, a solid stick is formed that has such purchase on the projection 30 by virtue of its undercut edge 32 that the stick will not rotate or fall out if the dispenser is turned upside down. The insert 4 is then mounted in the top portion of the outer sleeve 2 and adhered thereto so as to complete the assembly.

When a user tears away the central section 10 of the outer sleeve 2 by pulling on the tab 12, the portions of the outer sleeve 2 that are above and below the tear lines 6 and 8 respectively are not pulled loose, but the cap 14, 4 can be removed and replaced at any time, even after segments 18-25 of the inner sleeve 26 are torn away.

Figure 11:
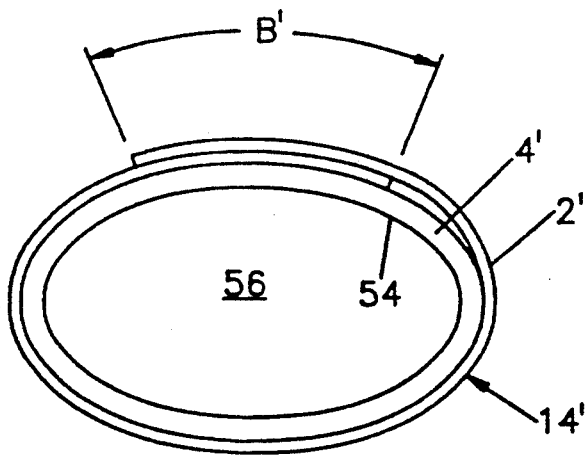
FIG. 11 is an end or axial view of the top of a dispenser constructed as in FIGS. 1–10 except that the inner and outer sleeves have an oval cross section.
Figure 12:
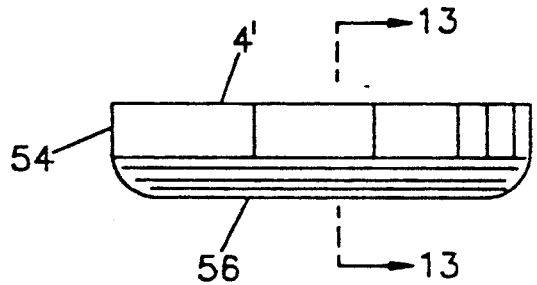
FIG. 12 is a front elevational view of an insert that is inserted into the top of the outer sleeve of FIG. 11 to close the upper end thereof.
Figure 13:
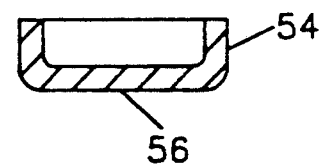
FIG. 13 is a cross sectional view taken at 13—13 of FIG. 12.

Reference is now made to FIG. 11 showing a top axial view of a dispenser of the invention having an oval radial cross section, for example. Other cross sectional shapes can also be used. Components corresponding in function to those shown in previous figures are designated by the same numbers primed. In a construction where the inner and outer sleeves are formed from separate sheets of material, only the outer sleeve 2' is seen. It has an overlap within an angle B' corresponding to the angle B in FIG. 7B. An insert 4' has a wall 54 rising around the periphery of a bottom member 56. FIG. 12 is an elevational front view of the insert 4' showing its wall 54 and its bottom 56, and FIG. 13 is a cross-sectional view taken along 13—13 of FIG. 12.

Figure 14:
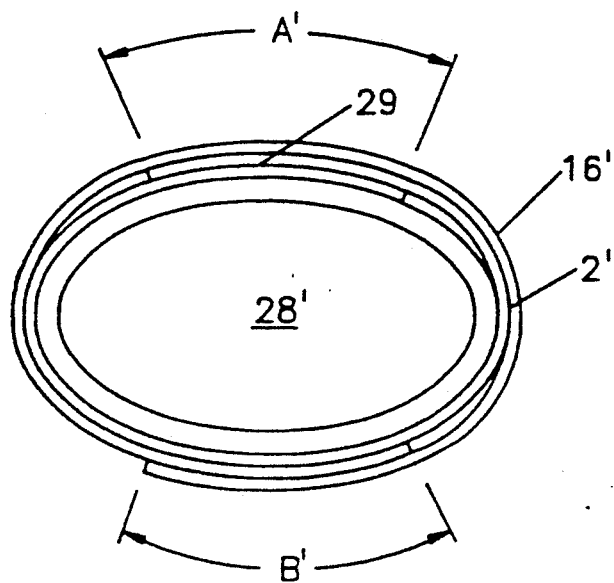
FIG. 14 is an end or axial view of the bottom of a dispenser having an oval cross section as in FIG. 11.

FIG. 14 is a bottom view of the dispenser for which FIG. 11 is a top view. Both the lower end 29 of the inner sleeve 26 and the lower portion 16' of the outer sleeve 2' are visible. The base 28' is located in the lower end 29 of the inner sleeve 26. As can be seen, the lower end 29 of the inner sleeve 26 has a region of overlap within an angle A', and the lower end 16' of the outer sleeve 2' has a region of overlap within an angle B'.

Figure 15:
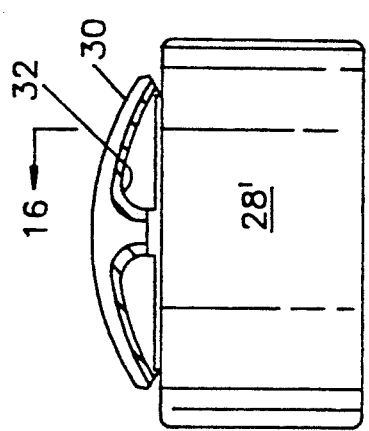
FIG. 15 is a front elevational view of a base member that forms the bottom of the inner sleeve shown in FIG. 14 in one embodiment of the invention.
Figure 16:
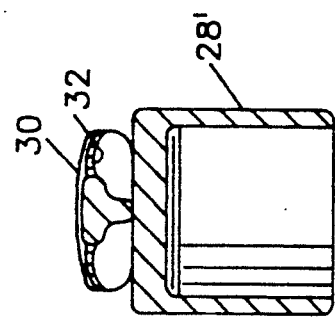
FIG. 16 is a cross-sectional view of the base of FIG. 15 taken along 16—16 of FIG. 15.

FIG. 15 is a front elevational view of the base 28' of FIG. 14 showing the projection 30 and its undercut edge 32. FIG. 16 is a sectional view taken along 16–16 of FIG. 15.

Figure 17:
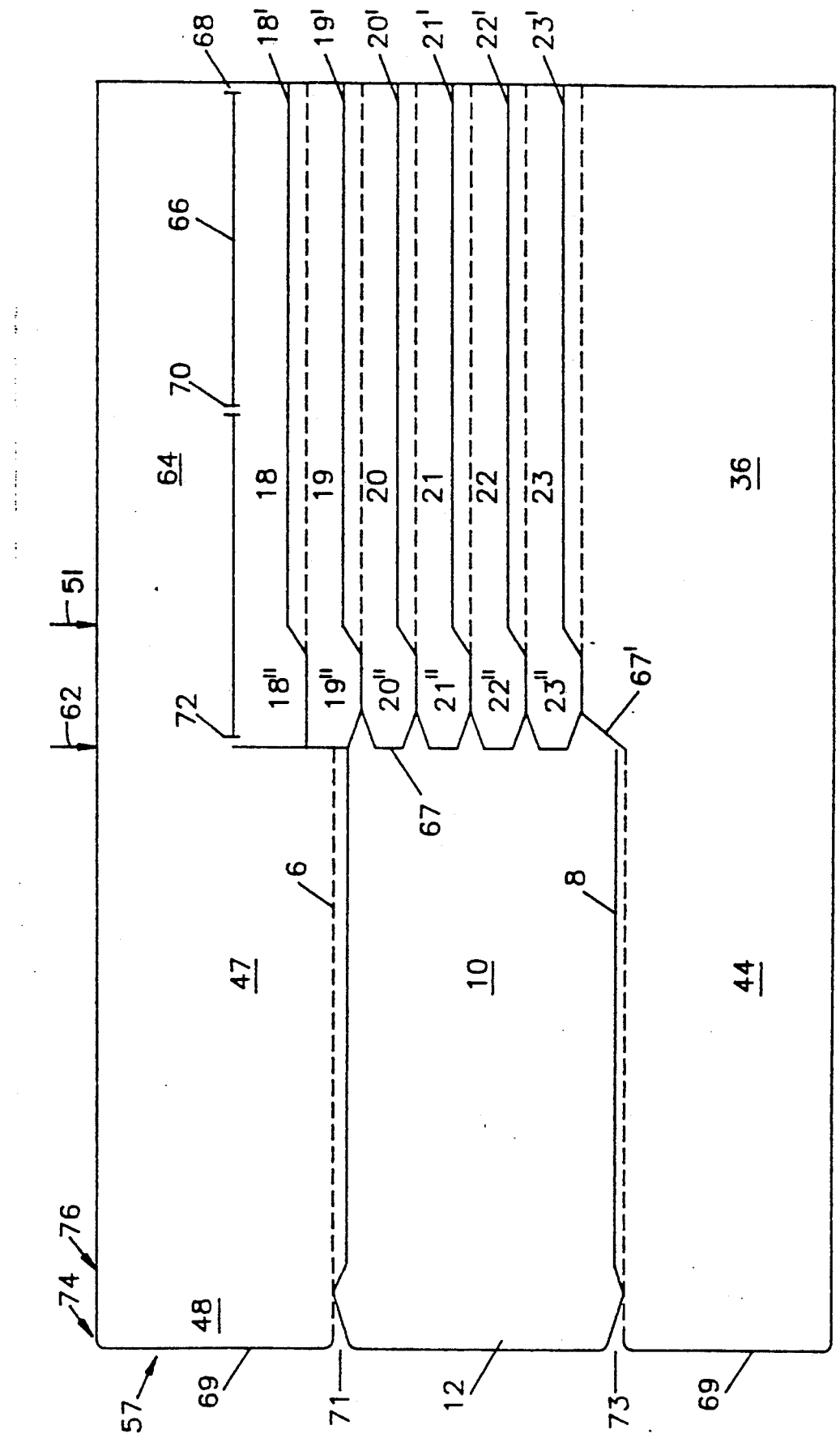
FIG. 17 is a layout of the glue side of a single sheet of material from which a product dispenser of this invention may be formed, in another embodiment of the invention, but the glue coatings are not shown.

Reference is made to FIG. 17, which shows the inner surface of a single sheet 57 of material from which a preferred form of a dispenser of this invention may be made. In this view, the glues that are to be applied to this surface are not shown. Single lines within the sheet indicate cuts on the surface shown that extend part way through the material, and dashed lines indicate cuts in the other surface that extend part way through the material so as to complete a double reverse cut of a tear line.

The portion of the sheet 57 to the right of an arrow 62 is like the sheet 27 shown in FIG. 8 except for the fact that it includes a strip 64 that is above a cut 66 and to the right of the arrow 62. The cut 66 is at the same point as the top 34 of the inner sleeve in FIG. 7A. The portion of the sheet to the left of the arrow 62 is the same as the sheet 42 of FIG. 9. Structural details of the sheet 57 that correspond to details of FIGS. 8 and 9 are indicated by the same numbers as in those figures. Because of a slight difference in construction, however, the inner sleeve will be referred to as 26" and the outer sleeve as 2".

In order to keep the strip 64 in the position shown when the sheet 57 is being wrapped around a base such as 28 so as to form the inner and outer sleeves. The cut 66 is interrupted at bridge points 68, 70 and 72 forming bridges that can be easily broken when required, but otherwise these bridges 68, 70 and 72 keep strip 64 secured to strip 18, in this example.

A cut is also made through the sheet 57 along a line 67 so that, preferably, each of the tabs 18"-23" is outlined, by the cut, and there is communication between the cut on the line 67 and each of the tear lines 18'-23'. This ensures that the pull on a tab will cleanly tear loose the one of the segments 18-23 for which it is an extension. Alternatively, the cut along the line 67 would define just the ends of the tabs 18"-23" and the tear lines 18'-23' could be extended to the left so as to communicate with it.

The tear lines 6 and 8 that will define the central section 10 of the outer sleeve portion 2" communicate with the cut 67 so that the central section 10 will be cleanly removed when the tab 12 is pulled. With the tear line 8 located as shown, the cut 67 is extended, as indicated at 67' so as to communicate with it.

Whereas the tear lines 6 and 8 could extend to an edge 69 of the sheet 57, it is preferable that notches 71 and 73 respectively communicating with the tear lines 6 and 8 be cut to the edge 69 so as to ensure that a pull on the tab 12 will cleanly tear loose the intermediate section 10.

The area of the sheet 57 that will be within a region of overlap of the inner sleeve 26" lies between the arrow 62 and an arrow 51, and the area of the sheet 57 that will be within the area of overlap of the outer sleeve 2" is between arrows 74 and 76, in this example.

Figure 18A:
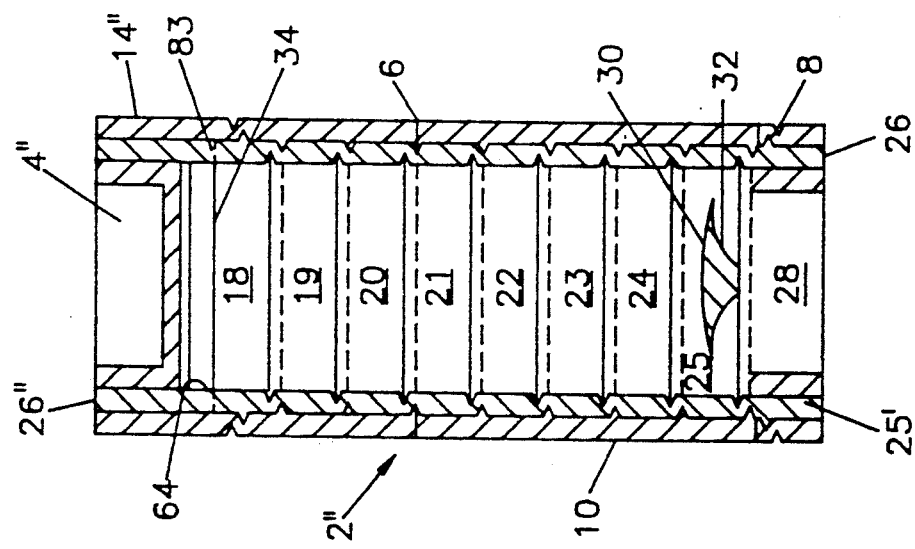
FIG. 18A is an axial cross section of a dispenser of this invention formed from the single sheet shown in FIG. 17.
Figure 18:
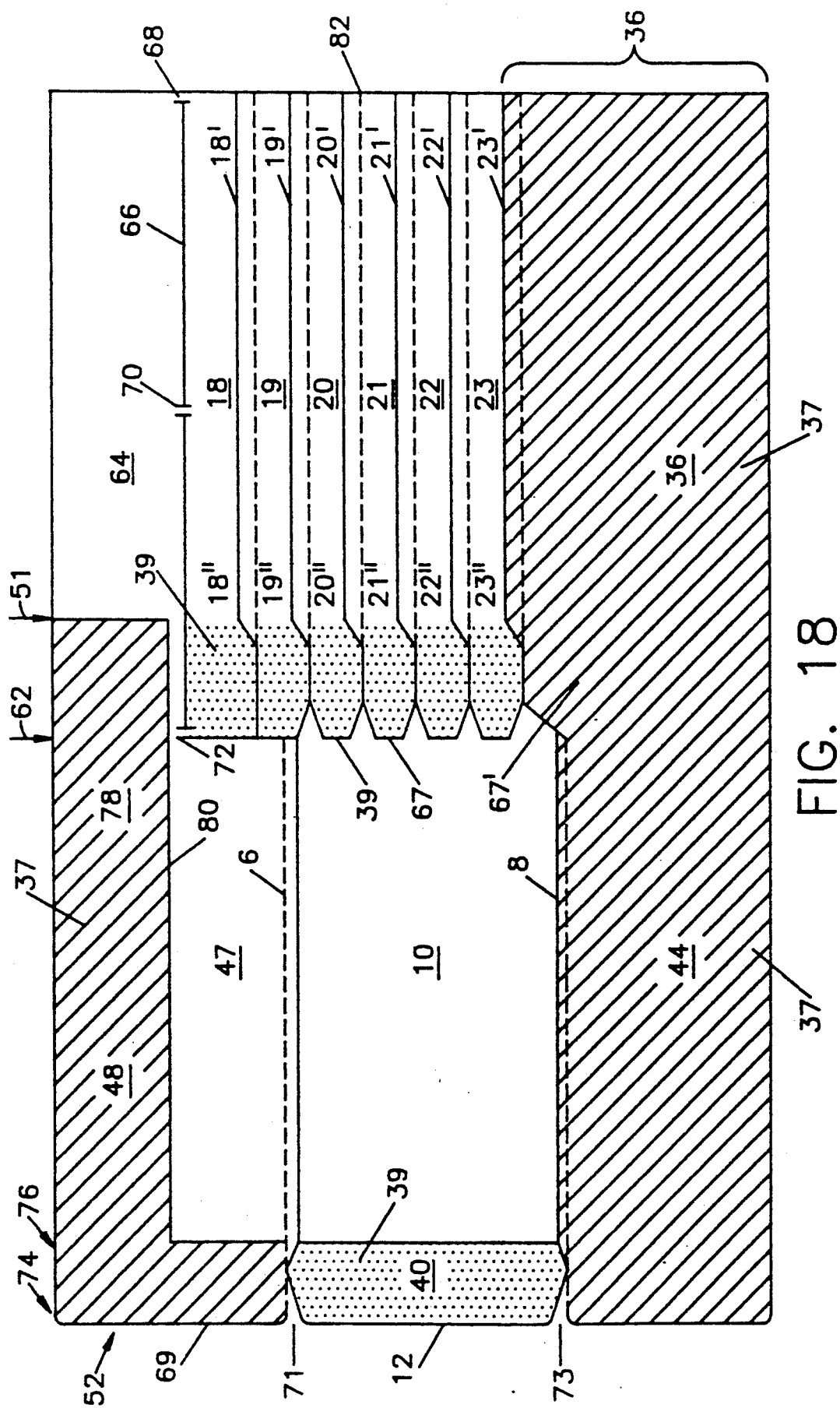
FIG. 18 shows the layout of the single sheet of FIG. 17 with indications of the locations of permanent and temporary glues thereon.

FIG. 18 is the same as FIG. 17 except that it additionally indicates areas coated with permanent glue 37 shown as diagonal lines, and areas coated with a pressure sensitive glue 39 or the like shown as speckling.

As in FIGS. 8 and 9, the areas 36 and 44 that are to be wrapped about a base such as 28 are coated with permanent glue 37 and the tabs 18"–23" (in this example) that are to be in the overlapped region of the inner sleeve 26", as well as the tab 12 that is to be within the overlapped region of the outer sleeve 2", are coated with semipermanent glue 39 such as one that is pressure sensitive. The area 48 that is to be within the area of overlap of the outer sleeve is coated with permanent glue 37 as in FIG. 9. In order to hold the additional strip 64 firmly however, permanent glue 37 (shown by diagonal lines) is applied to an area 78 in strip 64 that extends to the arrow 51 and lies above a line 80, which is just above the cut 66. No glue is required or needed below the line 80 because this area will overlap the top of the inner sleeve 26".

In assembling a dispenser with the single sheet 57 of FIG. 18, its right end 82 is pressed against a base like 28 of FIG. 18A, and it is wrapped around the base so as to form inner and outer sleeves 26" and 2" that are coaxial with the base 28. This structure is best seen in the axial cross section of FIG. 18A. The wrapping may also be around a mandrel that is coaxial with the base and has the same cross section, whereafter the base 28 is inserted and secured by friction and/or glue. The permanent glue 37 in the area 36 forms a permanent bond with the base 28. When the wrapping reaches a point where the material at the arrow 51 is in contact with the base 28, there has been one revolution around the base 28 and the material between the arrows 51 and 62 forms an overlap region for the inner sleeve 26". Instead of using a separate sheet to form the outer sleeve 2", the wrapping is continued so as to form the outer sleeve 2, and the area between the arrows 78 and 76 forms the overlap region of the outer sleeve 2". The inner sleeve 26" is filled up to the cut 66 (see FIG. 18) with product 27 in liquid form, and an insert 4" that is like the plug 4 except for the fact that it has a smaller diameter is bonded to the strip 64, or frictionally secured thereto upon insertion.

In the dispenser formed with the separate sheets 31 and 42 of FIGS. 8 and 9, the cap 14,4 formed by the areas 47 and 48 of FIG. 9 had an inner diameter that was larger than the outer diameter of the top 34 of the inner sleeve 26 so that it would slide down over it until the top of the inner sleeve reached the insert 4 mounted in the top of the outer sleeve 2. In a dispenser formed from the single sheet 57 of FIG. 18, however, the strip 64 lies inside the top section 14 of the outer sleeve 2 and has the same diameter as the top 34 of the inner sleeve. When the cap 14" is freed by tearing out the central section 10, and rotating cap 14" slightly to break the narrow bridges 66, 70, 72, the strip 64 forms a seat or step 83 that rests on the top 34 of the inner sleeve as shown on FIG. 18A so that the insert 4" plays no role in positioning the cap 14, 4".

Figure 19:
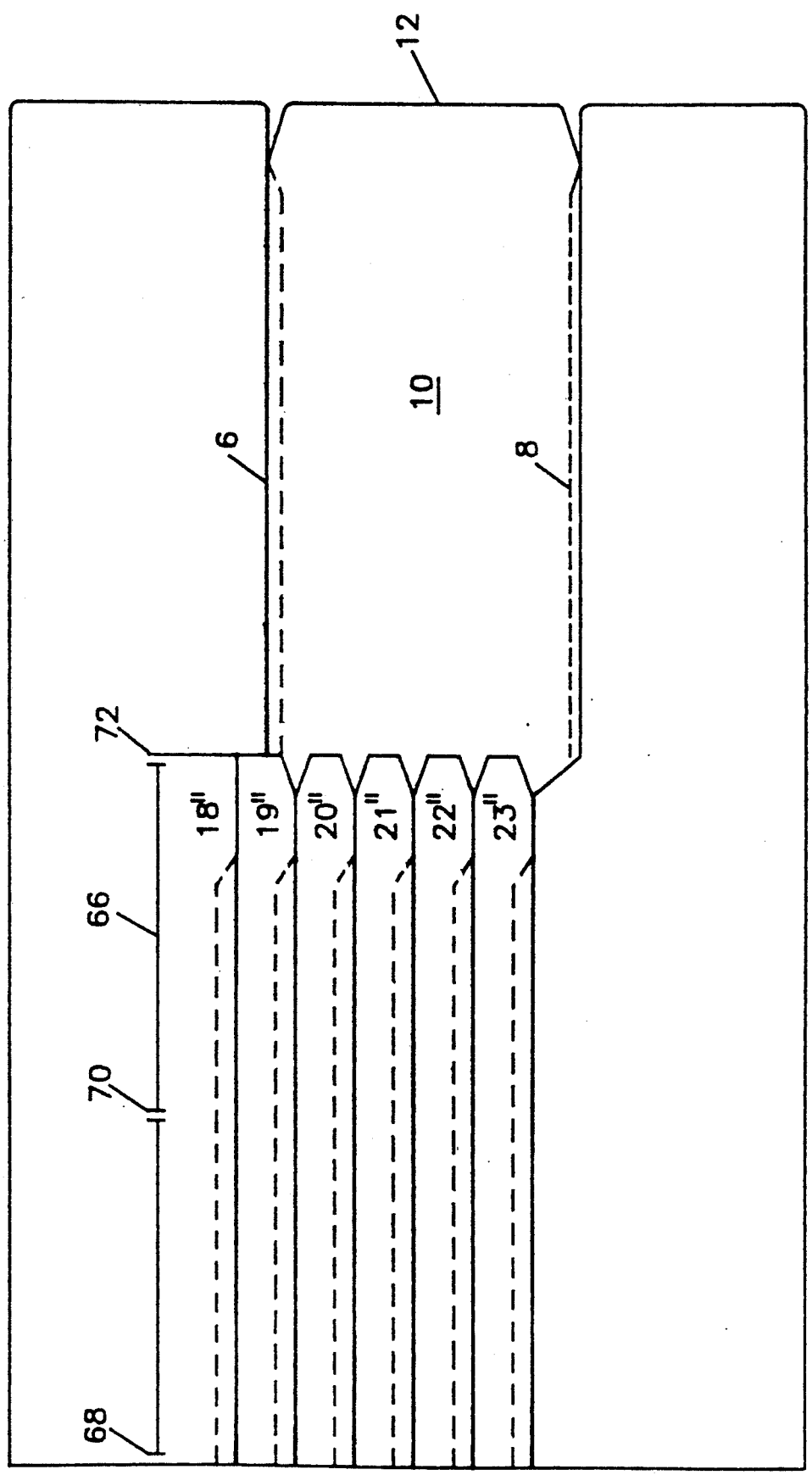
FIG. 19 is a layout of the outside surface of the single sheet of material of FIGS. 17 and 18.

FIG. 19 shows the surface of the sheet 57 on which any printing is to be done.

Figure 20:
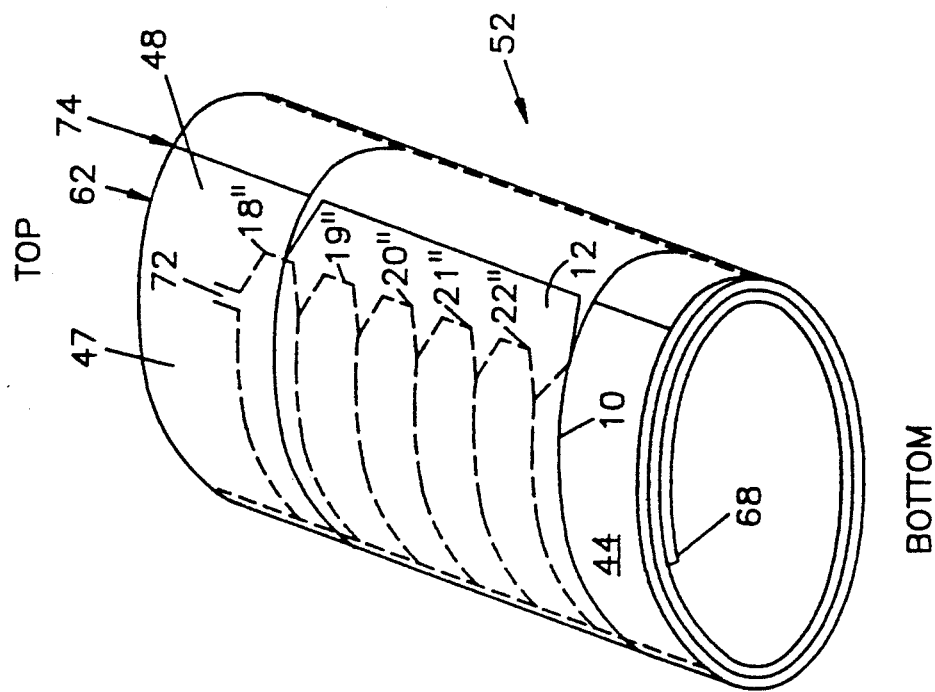
FIG. 20 is a pictorial or isometric view looking toward the bottom and front of a dispenser of the embodiment of this invention that is formed with the single sheet of material shown in FIGS. 17-19.

FIG. 20 is an isometric projection showing the sheet 52 of FIGS. 17, 18, and 19 as it would appear when rolled up as described.

It will be apparent that means other than the inserts 4, 4' and 4" could be provided for closing off the outer sleeves 2, 2' or 2". Covers could be provided having sides extending down the outside of the top of the outer sleeve 2, 2' or 2" and permanently adhered thereto.

The area 64 of FIGS. 17-19 could be omitted, in which case the dispenser would have the same general structure as one formed from separate sheets 31 and 42 of material but would not have spaces where a sheet passes over the end of a previous sheet as indicated at 85 of FIG. 7B.

In a prototype engineering model for the subject dispenser, the permanent glue 37 used was Elmer's Glue All ®, manufactured by Borden, Inc., Columbus, Ohio. The pressure sensitive adhesive or glue 39 used was DAIGE BB9 Speed Cote ® Pressure Sensitive Adhesive Wax, manufactured by Daige Products, Inc., Albertson, N.Y. 11507.

The present dispenser 2 provides a "Greenstick" container designed to minimize the amount of waste entering landfills, and to ensure that the waste from the dispenser that does enter landfills has the best opportunity to degrade. These objectives are accomplished by virtue of the following considerations:

1. The dispenser 2 is constructed primarily of recycled paper and pulp, in one embodiment of the invention, which utilizes reclaimed waste, thereby saving trees and energy.
2. In communities where conventional landfills are employed for waste disposal, the unique peel-away design and recycled paper construction minimizes the amount of waste by weight and by volume compared to most other containers.
3. The container 2 is biodegradable and therefore, compostable and degradable in communities which employ composting of waste and/or utilize anaerobic landfills.
4. Some communities incinerate much of their waste. The recycled paper construction of the dispenser 2 burns cleaner than materials used for typical containers, thereby producing less pollution.
5. All parts of the dispenser 2 are recyclable in the preferred embodiment except the base 28 due to residual product in the base. Therefore, in communities which currently recycle cereal boxes, for example, the dispenser 2 can be recycled.

Although various embodiments of the invention have been shown and described herein, they are not meant to be limiting. Those of skill in the art may recognize certain modifications to these embodiments, which modifications are meant to be covered by the spirit and scope of the appended claims. For example, the number of tear away segments 18-25 in one embodiment of the invention of FIG. 4 can be varied depending upon the application, as can the width of these segments. Also, the shape of the dispenser 2 for example, can be any practical shape such as a sleeve shape, cylindrical shape, round, oval, elliptical, and so forth.

What is claimed is:

1. A container capable of withstanding a direct fill of low viscosity product at high temperature for storing said product in solidified stick form, and for dispensing the product directly upon a surface, comprising:
   an inner sleeve having an axis;
   a base formed from material independent of said inner sleeve, for supporting a product stick mounted at one end of said inner sleeve, said base having a given circumference about which a lowermost portion of said inner sleeve is wrapped for forming an inner primary container for said product stick;

an outer sleeve mounted coaxially about said inner sleeve with one end of said outer sleeve being attached to said one end of said inner sleeve;

means affixed to and inserted within a top opening formed at another end of said outer sleeve for closing off said opening after filling said container with said product;

means forming a spaced pair of circumferential tear lines defining a circumferential central section in said outer sleeve; and means forming at least one pair of circumferential tear lines in said inner sleeve defining at least one tear away circumferential segment therein that is exposed when said central section of said outer sleeve is removed, wherein upon tearing away the central section of said outer sleeve, a remaining top portion of said outer sleeve with said closing means provides an integral cap for said container.

2. A container as set forth in claim 1, wherein said means for forming said tear lines is comprised of double reverse cut scores.

3. A container as set forth in claim 1, wherein one of said spaced pair of circumferential tear lines in said outer sleeve is between said base, and an end of said inner sleeve that is remote from said base.

4. A container as set forth in claim 1, wherein said inner and outer sleeves are formed with biodegradable sheet material wrapped around said axis.

5. A dispenser as set forth in claim 1, wherein said inner and outer sleeves are respectively formed from separate sheets of material wrapped about said axis.

6. A container as set forth in claim 1, wherein said inner and outer sleeves are formed from a single sheet of material wrapped around said axis.

7. A container as set forth in claim 1, wherein:
said inner and outer sleeves are formed from respective sheets of material wrapped about said base and said axis, the dimensions of said sheets in a circumferential direction being greater than the circumference of said base so that there are regions of overlap of each of said sheets with itself;
one end of the sheet forming said inner sleeve is permanently adhered to said base and to itself in said regions where the inner sheet overlaps itself;
a remaining portion of said last mentioned sheet above its one end is detachably adhered to itself in said regions where the inner sheet overlaps itself;
one end of a lowermost portion of the sheet forming said outer sleeve is permanently adhered to an outside of the end of the inner sheet that is adhered to said base and to itself in said regions where the inner sheet overlaps itself proximate said base;
another end of said sheet forming said outer sleeve is permanently bonded to itself in a topmost region where the outer sheet overlaps itself; and
a portion of said sheet forming said central section of said outer sleeve is detachably adhered to itself in said regions where the outer sheet overlaps itself.

8. A container as set forth in claim 1, wherein:
said inner sleeve is formed by a sheet of material wrapped around said base and said axis so as to have a region of overlap with itself;
a bottom portion of said sheet is permanently bonded to said base and to itself in the region of overlap; and
a portion of said sheet in which said tear lines are formed is temporarily bonded to itself in the region of overlap.

9. A container as set forth in claim 1, wherein:
said outer sleeve is formed from a sheet of material wrapped around said axis so as to have a region of overlap with itself;
a portion of said sheet that is below said central section is coated with permanent glue;
a coating of pressure sensitive glue is within a region of overlap of said central section of said sheet; and
a coating of permanent glue is on a section of said sheet above said central furthest away from said base, and within said region of overlap.

10. A container for storing a product in stick form, and for dispensing the product, said container comprising:
a base having a given circumference for supporting a product stick;
a first sheet of material having a lower portion, an upper portion and a width greater than the circumference of said base;
said first sheet being wrapped around said base so as to form an inner sleeve having a region of overlap;
means for permanently adhering the lower portion of said first sheet to said base and to itself in the region of overlap;
a plurality of tear lines in the upper portion of said first sheet that are parallel to the lower portion so as to define a plurality of circumferential segments;
said upper section of said first sheet being removably attached to itself in the region of overlap;
a second sheet that is wider than the circumference of said base and higher than said first sheet, said second sheet having lower and upper portions and a circumferential central section between them defined by tear lines;
said second sheet being wrapped around said inner sleeve so as to form an outer sleeve having a region of overlap and a projection extending beyond said inner sleeve;
means for permanently attaching the lower portion of said second sheet to the lower portion of said inner sleeve as well as to itself in the region where said second sheet overlaps itself;
means for removably attaching the central section of said second sheet to itself in the region where said second sheet overlaps itself;
means for permanently attaching said upper portion of said second sheet to itself in the region where said second sheet overlaps itself; and
means for closing off an open top end of said container.

11. The dispensing container of claim 10, wherein said first and second sheets consist substantially of biodegradable material.

12. A container for storing a product in stick form, and for dispensing the product, said container comprising:
a base having an axis and a given circumference;
a sheet of material having first and second ends, a top edge and a bottom edge;
said first end of said sheet being attached to said base so as to be parallel to said axis, and a remaining portion of said sheet being wrapped around said base and said axis;
a cut extending through said sheet that is perpendicular to a first end slit, said cut being longer than said circumference;

a plurality of spaced tear lines having lengths equal to said circumference and parallel to said cut so as to define a plurality of slit segments;

a plurality of tabs defined by cuts through said sheet respectively extending from said segments;

a central section defined by spaced tear lines that are parallel to said top edge of said sheet, said latter tear lines communicating with the cuts forming said tabs and having a length at least equal to said circumference; and a tab extending from an end of said central section at the second end of said sheet.

13. A container as set forth in claim 12, wherein a first portion of one surface of said sheet that is between said slit segments and a bottom portion of said sheet is permanently glued to said base.

14. A container as set forth in claim 13, wherein a second portion of said one surface of said sheet between said central section and the bottom of said sheet is permanently glued to a portion of a surface opposite said one surface of said first portion of said sheet.

15. A container as set forth in claim 14, wherein said tabs are removably adhered to a portion of said opposite surface of said sheet.

16. A container as set forth in claim 15, wherein a third portion of said sheet that extends along said top edge and is spaced from said central section is permanently glued to said opposite surface of said sheet.

17. The container of claim 12, wherein said sheet of material substantially includes a biodegradable material.

18. A container for storing products in stick form, and for dispensing the product, said container comprising:

a sheet of material rolled on itself to form a body for said container;

a plurality of parallel tear lines extending a given distance from a first edge of said sheet so as to define a plurality of contiguous segments, there being a first area between said segments and a second edge of said sheet;

cuts through said sheet defining tabs extending from ends of said segments; and a pair of parallel tear lines in said sheet that are on an opposite side of said tabs from said segments, said tear lines communicating with said cuts and defining a central section so that there is a second are between said segments and said second edge, and a third area between said segments and a third edge that is parallel to said second edge.

19. The container of claim 18, wherein said sheet substantially consists of biodegradable material.

20. A container as set forth in claim 18 further comprising:

a cut through said sheet of material along a side of a segment that is remote from said second edge so as to define a fourth area that is on an opposite side of said segments from said first area; and said cut communicating with the cuts defining said tabs.

21. A container as set forth in claim 18, further comprising:

cuts through said sheet of material extending from said second edge that respectively communicate with said tear lines; and said last mentioned cuts forming a tab between them.

22. A container as defined in claim 18 further comprising:

a coat of permanent glue within said first, second and third areas of said sheet of material.

23. A container as set forth in claim 22 further comprising:

a coat of pressure sensitive glue on said tabs of said sheet of material.

24. The container of claim 18, wherein said sheet of material substantially includes biodegradable material.

* * * * *

UNITED STATES PATENT AND TRADEMARK OFFICE
CERTIFICATE OF CORRECTION

PATENT NO. : 5,217,164
DATED : June 8, 1993
INVENTOR(S) : Thomas D. Sullivan

It is certified that error appears in the above-indentified patent and that said Letters Patent is hereby corrected as shown below:

Column 4, line 36 before "7A" insert --Fig.--.

Column 7, line 46, change "14" to -- - --.

Column 9, claim 5, line 1, change "dispenser" to --container--.

Column 10, claim 9, line 10, after "central" insert --section--.

Column 10, claim 11, line 1, delete "dispensing".

Column 11, claim 17, line 2, delete "a".

Column 12, claim 18, line 15, change "are" to --area--.

Signed and Sealed this

First Day of February, 1994

Attest:

BRUCE LEHMAN

*Attesting Officer*          *Commissioner of Patents and Trademarks*